United States Patent
Lim et al.

(10) Patent No.: US 8,868,117 B2
(45) Date of Patent: Oct. 21, 2014

(54) METHOD FOR GROUPING ACCESS POINTS IN HIGH SPEED MOBILE ENVIRONMENT AND COMMUNICATION SYSTEM USING THE METHOD

(75) Inventors: Jong Bu Lim, Yongin-si (KR); Tae Soo Kwon, Hwaseong-si (KR); Sung Ho Chae, Seoul (KR); Sae Young Chung, Daejeon-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 777 days.

(21) Appl. No.: 13/005,381

(22) Filed: Jan. 12, 2011

(65) Prior Publication Data

US 2011/0319106 A1 Dec. 29, 2011

(30) Foreign Application Priority Data

Jun. 25, 2010 (KR) ........................ 10-2010-0060446

(51) Int. Cl.
*H04B 7/216* (2006.01)

(52) U.S. Cl.
USPC .......................................................... 455/500

(58) Field of Classification Search
CPC ...... H04B 7/024; H04W 84/045; H04M 3/18; H04M 3/306; H04M 3/34
USPC .......................................................... 455/500
See application file for complete search history.

(56) References Cited

U.S. PATENT DOCUMENTS

| | | | |
|---|---|---|---|
| 6,891,897 B1 * | 5/2005 | Bevan et al. | 375/265 |
| 7,907,552 B2 * | 3/2011 | Ashikhmin et al. | 370/280 |
| 8,126,405 B2 * | 2/2012 | Duan et al. | 455/67.16 |
| 8,194,760 B2 * | 6/2012 | Papadopoulos | 375/260 |
| 8,229,443 B2 * | 7/2012 | Caire et al. | 455/446 |
| 8,279,954 B2 * | 10/2012 | Papadopoulos et al. | 375/260 |
| 8,325,685 B2 * | 12/2012 | Ebrahimi Tazeh Mahalleh et al. | 370/336 |
| 8,325,840 B2 * | 12/2012 | Bursalioglu et al. | 375/267 |
| 8,451,951 B2 * | 5/2013 | Caire et al. | 375/340 |
| 2006/0105709 A1 * | 5/2006 | Oh et al. | 455/13.1 |
| 2008/0101310 A1 * | 5/2008 | Marzetta | 370/342 |
| 2010/0067601 A1 * | 3/2010 | Koslov et al. | 375/267 |
| 2010/0203839 A1 * | 8/2010 | Duan et al. | 455/67.11 |
| 2011/0034145 A1 * | 2/2011 | Youn et al. | 455/404.1 |

FOREIGN PATENT DOCUMENTS

| | | |
|---|---|---|
| KR | 10-2006-0119144 | 11/2006 |
| KR | 10-2009-0073910 | 7/2009 |
| WO | WO 2008/069796 | 6/2008 |

* cited by examiner

*Primary Examiner* — Bobbak Safaipour
(74) *Attorney, Agent, or Firm* — NSIP Law

(57) ABSTRACT

Provided is an access point grouping method to be performed in a high speed mobile environment and a communication system using the access point grouping method. A system capacity may be improved by grouping users having different movement speeds with respect to various channel environments classified based on existence of an LOS channel, and by performing beamforming. Channel information with respect to a user moving at a high speed may not be required, and thus overhead may be reduced.

25 Claims, 8 Drawing Sheets

METHOD FOR GROUPING ACCESS POINTS IN HIGH SPEED MOBILE ENVIRONMENT AND COMMUNICATION SYSTEM USING THE METHOD

CROSS-REFERENCE TO RELATED APPLICATION(S)

This application claims the benefit under 35 U.S.C. §119(a) of Korean Patent Application No. 10-2010-0060446, filed on Jun. 25, 2010, in the Korean Intellectual Property Office, the entire disclosure of which is incorporated herein by reference for all purposes.

BACKGROUND

1. Field

The following description relates to a communication method and apparatus in a high speed mobile environment.

2. Description of Related Art

When a coherence time of a channel is shorter than a time in which a receiving end feeds back and processes channel information, a transmitting end may not receive the channel information. In a high speed mobile environment, a channel fading coefficient quickly varies as a movement speed of a terminal increases, and the coherence time of the channel becomes short and thus, the transmitting end may have difficulty in obtaining the channel information.

SUMMARY

The following description relates to a communication method in which a base station generates a transmission beamforming vector based on conditions attendant to a first and second moving access point, wherein the first moving access point is moving faster than the second access point, to improve communications with the faster moving access point.

The foregoing and/or other features and aspects may be achieved by providing a communication method of a base station, the method including grouping at least two access points to include an access point moving at a first range speed and at least one access point moving at a second range speed, the grouping being performed based on movement speed information associated with the at least two access points and information associated with whether line of sight (LOS) channels exist between the at least two access points and a base station, and the first access range speed being faster than the second access range speed, and generating a transmission beamforming vector based on a result of the grouping based on the movement speed information and the information associated with whether the LOS channels exist.

The communication method may further include requesting, from the at least two access points, the movement speed information and/or the information associated with whether the LOS channels exist with respect to the corresponding access points.

The communication method may further include measuring, using an uplink channel and/or a speed measuring device, the movement speed information and/or the information associated with whether the LOS channels exist.

The grouping may include grouping the access point moving at the first range speed and having a non line of sight (NLOS) channel and the at least one access point moving at a second range speed and having an NLOS channel.

The communication method may further include estimating channel information associated with the grouped at least one access point moving at the second range speed.

The generating may include generating, based on channel information associated with the grouped at least one access point moving at the second range speed, a transmission beamforming vector with respect to the grouped at least one access point moving at the second range speed, and generating, based on a null vector of a channel with respect to the grouped at least one access point moving at the second range speed, a transmission beamforming vector with respect to the access point moving at the first range speed.

The grouping may include grouping the access point moving at the first range speed and having an LOS channel and at least two access points moving at the second range speed and having LOS channels.

The generating may include generating the transmission beamforming vector based on a time and spatial correlation of channels with respect to the grouped access points.

The grouping may include grouping the access point moving at the first range speed and having an LOS channel and at least two access points moving at the second range speed and having NLOS channels.

The communication method may further include requesting, from the grouped access point moving at the first range speed, location information associated with the grouped access point moving at the first range speed to estimate angle information associated with the grouped access point moving at the first range speed, and estimating the angle information based on the location information.

The generating may include generating the transmission beamforming vector based on the angle information associated with the grouped access point moving at the first range speed.

The foregoing and/or other features and aspects may also be achieved by providing a base station, including an access point group forming unit to perform grouping of at least two access points to include an access point moving at a first range speed and at least one access point moving at a second range speed, the grouping being performed based on movement speed information associated with the at least two access points and information associated with whether LOS channels exist between the at least two access points and a base station, and a beamforming unit to generate a transmission beamforming vector based on a result of the grouping based on the movement speed information and the information associated with whether the LOS channels exist.

The base station may further include a transmitting unit to request, from the at least two access points, the movement speed information of the corresponding access points and/or the information associated with whether the LOS channels exist with respect to the corresponding access points.

The base station may further include a speed and LOS measuring unit to estimate, using an uplink channel and/or a speed measuring device, the movement speed information and/or the information associated with whether the LOS channels exist.

The access point group forming unit may perform grouping of the access point moving at the first range speed and having an NLOS channel and the at least one access point moving at the second range speed and having an NLOS channel.

The beamforming unit may perform generating, based on channel information associated with the grouped at least one access point moving at the second range speed, a transmission beamforming vector with respect to the grouped at least one access point moving at the second range speed and generating, based on a null vector of a channel with respect to the grouped at least one access point moving at the second range speed, a transmission beamforming vector with respect to the access point moving at the first range speed.

The access point group forming unit may perform grouping of the access point moving at the first range speed and having an LOS channel and at least two access points moving at the second range speed and having LOS channels.

The beamforming unit may generate the transmission beamforming vector based on a time and spatial correlation of channels with respect to the grouped access points.

The access point group forming unit may perform grouping of the access point moving at the first range speed and having an LOS channel and at least two access points moving at the second range speed and having NLOS channels.

The beamforming unit may generate the transmission beamforming vector based on angle information associated with the grouped access point moving at the first range speed.

The foregoing and/or other features and aspects may also be achieved by providing an access point, including a receiving unit to receive, from a base station, data and requests for various information to be used for grouping the access point with other access points or generating a transmission beamforming vector, a controller to control a corresponding module by analyzing the requests received from the base station, a speed estimating unit to estimate a movement speed of the access point based on the control of the controller, an LOS channel determining unit to determine, based on the control of the controller, whether an LOS channel exists between the base station and the access point, and a transmitting unit to feed back, to the base station, movement speed information associated with the access point and the information associated with whether the LOS exists.

The access point may further include a location estimating unit to estimate, based on the control of the controller, location information associated with the access point to enable the base station to use the estimated location information to estimate angle information associated with the access point.

The access point may further include a channel estimating unit to estimate a channel between the base station and the access point, based on the control of the controller.

The access point may further include a decoding unit to decode the data received from the base station based on a zero-forcing scheme.

The foregoing and/or other features and aspects may also be achieved by providing a communication method of a base station, the method including generating a transmission beamforming vector to communicate with a first access point moving faster than a second access point based on movement speed of the first and second access points and information regarding whether line of sight (LOS) channels exist between the base station and the first and second access points.

Example embodiments may improve a system capacity by appropriately grouping access points having different speeds and by performing beamforming even when a base station has a difficulty in obtaining corresponding channel information because an access point moves at a high speed. Therefore, the channel information associated with the access point moving at the high speed may not be needed for transmitting data and thus, overhead may be reduced.

Example embodiments may reduce a complexity of a beamforming process using a linear beamforming scheme. Therefore, a beamforming scheme appropriate for a high speed mobile environment may be performed.

Example embodiments may provide a user grouping method and a beamforming method for each of various environments classified based on an existence of an LOS channel or an NLOS channel, and thus may improve a communication performance in each of a plurality of various high speed mobile environments.

Example embodiments may perform a transmission beamforming based on channel information associated with an access point moving at a low speed or angle information associated with an access point moving at a high speed, and thus may reduce an amount of information used for performing the beamforming.

Example embodiments may generate a transmission beamforming vector based on a time or spatial correlation of channels with respect to access points, and thus may reduce a complexity of a beamforming process.

Other features and aspects may be apparent from the following detailed description, the drawings, and the claims.

BRIEF DESCRIPTION OF THE DRAWINGS

These and/or other aspects will become apparent and more readily appreciated from the following description of various example embodiments, taken in conjunction with the accompanying drawings briefly described below.

Figure 1:
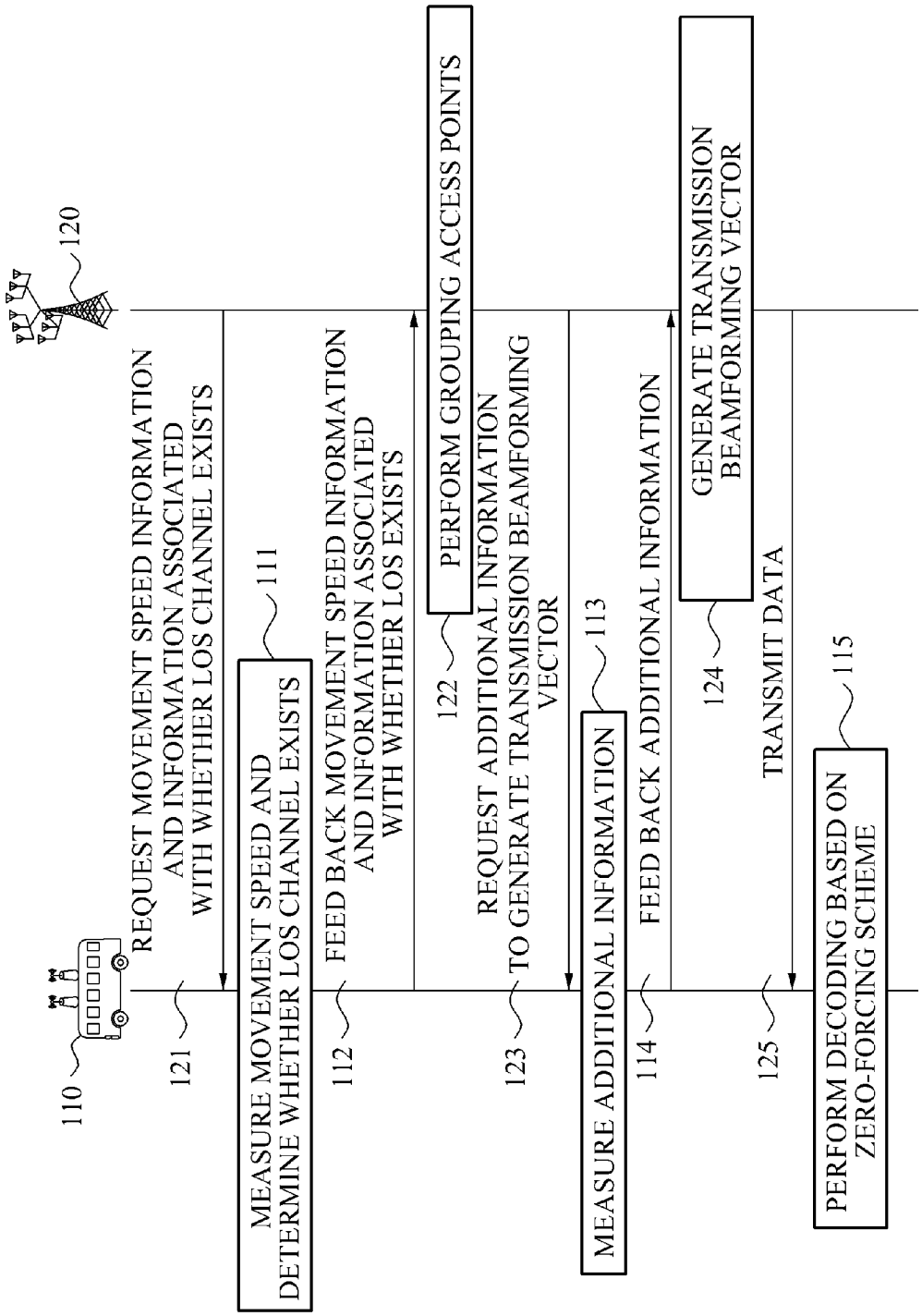
FIG. 1 is a flowchart illustrating an example of a communication system that may use a user grouping method in a high speed mobile environment.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing operations described is an example; however, the sequence of operations is not limited to that set forth herein and may be changed as is known in the art, with the exception of operations necessarily occurring in a certain order. Also, descriptions of well-known functions and constructions may be omitted for increased clarity and conciseness.

According to example embodiments, there may be provided a beamforming scheme that may appropriately perform a grouping of access points having different speeds in to response to a base station having a difficulty in obtaining corresponding channel information due to an access point moving at a high speed, and may apply a multiple user-multiple input multiple output (MU-MIMO) scheme and thus improve a system capacity. The base station may group a single access point moving at a high speed and multiple access points moving at a low speed. In this description, the low speed may be described as being sufficiently different from the high speed, which indicates that the low speed is sufficiently different from the high speed such that the base station does not have the difficulty in obtaining corresponding channel information from the access point moving at the low speed that is encountered with the access point moving at the high speed.

In the example embodiments, a base station may be a remote radio head (RRH) to support a femtocell for vehicles. The base station may be connected, such as, for example, through an optical cable, to other base stations to easily exchange information. An access point may be a terminal or may be a base station for vehicles, corresponding to the femtocell for vehicles.

An environment in the example embodiments may be an environment in which an access point moves at a high speed, and the environment may include an environment in which only access points having line of sight (LOS) channels exist, an environment in which only access points having non line of sight (NLOS) channels exists, and an environment in which one or more access points having LOS channels and one or more access points having NLOS channels both exist.

FIG. 1 illustrates an example of a communication system that may use a user grouping method in a high speed mobile environment.

Referring to FIG. 1, the communication system that uses the user grouping method in the high speed mobile environment may include an access point 110 and a base station 120. Although the communication system may include more than one access point, an operation of the single access point 110 is described in FIG. 1, for ease of description.

Referring to FIG. 1, the base station 120 may request, from the access point 110, mobile speed information associated with the access point 110 and information associated with whether a line of sight (LOS) channel exists in operation 121.

The presence of an LOS channel may indicate that an obstacle does not exist between the access point 110 and the base station 120, and the presence of an NLOS channel may indicate that an obstacle does exist between the access point 110 and the base station 120.

In response to the request of the base station 120, the access point 110 may measure a movement speed of the access point 110 and may estimate whether the LOS channel exists between the base station 120 and the access point 110 in operation 111.

The access point 110 may feed back, to the base station 120, the movement speed information associated with the access point 110 and the information associated with whether the LOS channel exists in operation 112.

The base station 120 may perform a grouping of access points, based on the movement speed information and the information associate with whether the LOS channel exists which are fed back from the access point 110, and based on information received from at least one different access point, namely, movement speed information associated with at least one different access point and information associated with whether an LOS channel exists between the base station 120 and the at least one different access point. In this case, the base station 120 may perform the grouping of the access points so as to include an access point moving at a first range speed and at least one access point moving at a second range speed in operation 122.

In this case, the base station 120 may directly obtain movement speed information associated with the access points and information associated with whether LOS channels exist with respect to the access points, as opposed to receiving that information from the access points. For example, the base station 120 may obtain the movement speed information and the information associated with whether the LOS channels exist using an uplink channel, a speed measuring device, and/or the like, without performing operations 121, 111, and 112. The base station 120 may perform the grouping of the access points based on the movement speed information and the information associated with whether the LOS channels exist.

The first range speed may be sufficiently faster than the second range speed. In a case of an access point moving at the first range speed, the base station 110 may have difficulty in obtaining corresponding channel information due to a coherence time of a channel being short. In a case of an access point moving at a second range speed, the base station 110 may obtain the corresponding channel information due to the coherence time of the channel being sufficiently long. Accordingly, the first range speed is referred to as a 'high speed' and the second range speed is referred to as a 'low speed'.

The base station 120 may request, from the access point 110, additional information to be used to generate a transmission beamforming vector, based on a result of the grouping, in operation 123. Channel information associated with a channel between the access point 110 and the base station 120, and location information associated with the access point 110 may be examples of the additional information. However, it is understood that other types of additional information may be used, instead of or in combination with these listed types of additional information, to generate the transmission beamforming vector.

The access point 110 may measure the requested additional information in operation 113, and may feed back the measured additional information to the base station 120 in operation 114.

The base station 120 may generate the transmission beamforming vector based on the result of the grouping in operation 124. In this case, the base station 120 may generate the transmission beamforming vector based on the information fed back from the access point 110.

The base station 120 may transmit data to the access point 110 using the generated beamforming vector in operation 125.

The access point 110 may decode the received data based on a zero-forcing scheme in operation 115.

Figure 2:
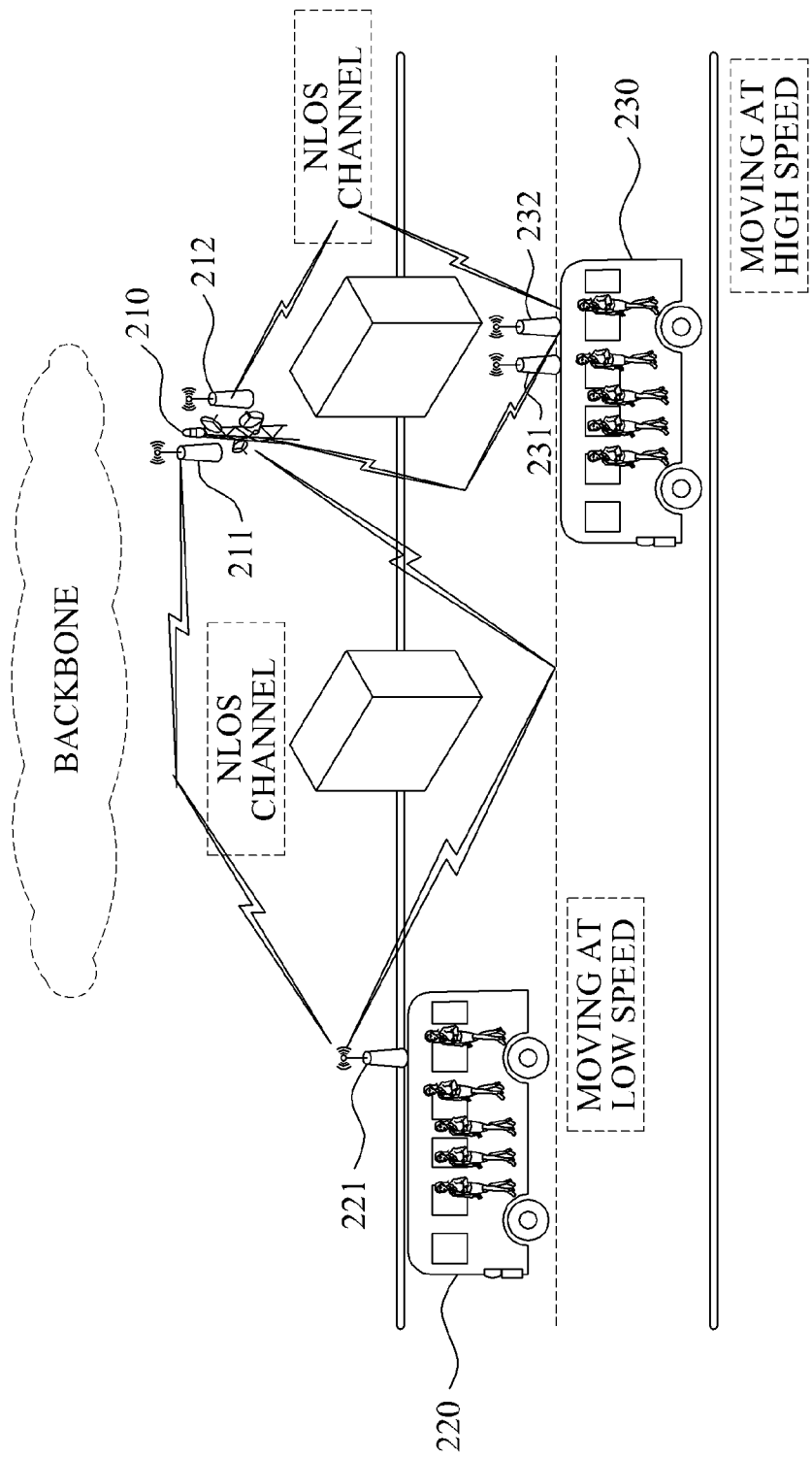
FIG. 2 is a diagram illustrating an example of grouped access points in a non line of sight (NLOS) channel environment.

FIG. 2 illustrates an example of grouped access points in an NLOS channel environment.

Referring to FIG. 2, an access point grouping method in which a base station performs broadcasting to multiple access points included in the NLOS channel environment, and a communication method based on the access point grouping method, will be described.

The access point grouping method and the communication method may be applicable to a case in which a base station includes an arbitrary number of antennas and/or may be applicable to a case in which an arbitrary number of access points moving at a low speed exist. For ease of description, a case in which there exists a single access point moving at a high speed and a single access point moving at a low speed will be described as below.

The base station 210 may perform a grouping a high speed access point 230 and a low speed access point 220, the high speed access point 230 having an NLOS channel and moving at a high speed and the low speed access point 220 having an NLOS channel and moving at a low speed that is sufficiently different from the high speed. It is assumed in this example that a base station 210 may obtain corresponding channel information since a coherence time of a channel is sufficiently long in the case of the low speed access point 220, whereas the base station 210 may not obtain corresponding channel information since a coherence time of a channel is short in the case of the high speed access point 230. It is also assumed in this example that the base station 210 uses two antennas 211 and 212, the low speed access point 220 uses an antenna 221, and the high speed access point 230 uses two antennas 231 and 232.

The communication method may be applicable to a scenario in which an RRH or a road side unit (RSU) installed in the vicinity of a road transmits data to a vehicle on the road. In this example, distances from the base station 210 to the access points 220 and 230 are shorter than a general case. Therefore, when degrees of freedom (DoF) is increased a transmission rate may be improved.

A beamforming method to control interference based on a result of the grouping may be described as below. When a symbol extension through two time slots is assumed, a signal that the low speed access point 220 receives may be expressed by Equation 1.

$$\begin{bmatrix} y^{[1]}(1) \\ y^{[1]}(2) \end{bmatrix} = \begin{bmatrix} h_1^{[1]}(1) & h_2^{[1]}(1) & 0 & 0 \\ 0 & 0 & h_1^{[1]}(1) & h_2^{[1]}(1) \end{bmatrix} X + Z^{[1]} \quad \text{[Equation 1]}$$

In Equation 1, X may denote a signal that the base station 210 transmits, y may denote a received signal, h may denote a channel gain, and Z may denote noise. (.) may denote a time index. A superscript [.] may denote an index of an access point, and a subscript of h may denote an index of an antenna. More specifically, as an example, $h_1^{[1]}$ denotes a channel gain between a first antenna 211 of the base station 210 and the low speed access point 220, and $h_2^{[1]}$ denotes a channel gain between a second antenna 212 of the base station 210 and the low speed access point 220. Z may denote noise.

The coherence time of the channel of the low speed access point 220 is assumed to be long and thus, the channel gain may not be changed although a time index is changed, from 1 to 2.

In the same manner, a signal that the high speed access point 230 receives may be expressed by Equation 2.

$$\begin{bmatrix} y_1^{[2]}(1) \\ y_2^{[2]}(1) \\ y_1^{[2]}(2) \\ y_2^{[2]}(2) \end{bmatrix} = \begin{bmatrix} h_{11}^{[2]}(1) & h_{12}^{[2]}(1) & 0 & 0 \\ h_{21}^{[2]}(1) & h_{22}^{[2]}(1) & 0 & 0 \\ 0 & 0 & h_{11}^{[2]}(2) & h_{12}^{[2]}(2) \\ 0 & 0 & h_{21}^{[2]}(2) & h_{22}^{[2]}(2) \end{bmatrix} X + Z^{[2]} \quad \text{[Equation 2]}$$

In the Equation 2, a subscript of y may denote an index of an antenna of an access point. 'a' of a subscript of $h_{ab}$, namely, 'a' of 'ab', may denote an index of an antenna of a corresponding access point, and 'b' may denote an index of an antenna of the base station 210. Therefore, channel gains may be channel gains of a 2×2 multiple input multiple output (MIMO) channel between the base station 210 and the high speed access point 230. According to example embodiments, the base station 210 may generate a transmission signal X as expressed by Equation 3, using a linear beamforming scheme, to obtain a high DoF in the NLOS channel environment.

$$X = \begin{bmatrix} 1 & 0 \\ 0 & 0 \\ 0 & 0 \\ 0 & 1 \end{bmatrix} \begin{bmatrix} u_1^{[1]} \\ u_2^{[1]} \end{bmatrix} + \begin{bmatrix} h_2^{[1]}(1) & 0 \\ -h_1^{[1]}(1) & 0 \\ 0 & h_2^{[1]}(1) \\ 0 & -h_1^{[1]}(1) \end{bmatrix} \begin{bmatrix} u_1^{[2]} \\ u_2^{[2]} \end{bmatrix} \quad \text{[Equation 3]}$$

In Equation 3, $u_1^{[1]}$ and $u_2^{[1]}$ may respectively denote a first symbol and a second symbol to be transmitted to the low speed access point 220. In the same manner, $u_1^{[2]}$ and $u_2^{[2]}$ may respectively denote a first symbol and a second symbol to be transmitted to the high speed access point 230.

The base station 210 may use channel information associated with the low speed access point 220 to generate the transmission signal. Accordingly, the base station 210 may estimate the channel information associated with the low speed access point 220. The base station 210 may request the low speed access point 220 to estimate the channel information. The base station 210 may transmit a pilot signal to the low speed access point 220, and the low speed access point 220 may estimate the channel information based on the received pilot signal. The low speed access point 220 may feed back the estimated channel information to the base station 210.

When transmission beamforming is performed as described above, a signal that the low speed access point 220 receives may be expressed by Equation 4.

$$\begin{bmatrix} y^{[1]}(1) \\ y^{[1]}(2) \end{bmatrix} = \begin{bmatrix} h_1^{[1]}(1) & 0 \\ 0 & h_2^{[1]}(1) \end{bmatrix} \begin{bmatrix} u_1^{[1]} \\ u_2^{[1]} \end{bmatrix} + Z^{[1]} \quad \text{[Equation 4]}$$

Referring to Equation 4, the base station 210 may transmit two data streams to the low speed access point 220.

When the transmission beamforming is performed, a signal that the high speed access point 230 receives may be expressed by Equation 5.

$$\begin{bmatrix} y_1^{[2]}(1) \\ y_2^{[2]}(1) \\ y_1^{[2]}(2) \\ y_2^{[2]}(2) \end{bmatrix} =$$

$$\begin{bmatrix} h_{11}^{[2]}(1) & 0 \\ h_{21}^{[2]}(1) & 0 \\ 0 & h_{12}^{[2]}(2) \\ 0 & h_{22}^{[2]}(2) \end{bmatrix} \begin{bmatrix} u_1^{[1]} \\ u_2^{[1]} \end{bmatrix} + \begin{bmatrix} \alpha_1 & 0 \\ \alpha_2 & 0 \\ 0 & \alpha_3 \\ 0 & \alpha_4 \end{bmatrix} \begin{bmatrix} u_1^{[2]} \\ u_2^{[2]} \end{bmatrix} + Z^{[2]}$$

$$\alpha_1 = h_{11}^{[2]}(1)h_2^{[1]}(1) - h_{12}^{[2]}(1)h_1^{[1]}(1),$$

$$\alpha_2 = h_{21}^{[2]}(1)h_2^{[1]}(1) - h_{22}^{[2]}(1)h_1^{[1]}(1)$$

$$\alpha_3 = h_{11}^{[2]}(2)h_2^{[1]}(1) - h_{12}^{[2]}(2)h_1^{[1]}(1),$$

$$\alpha_4 = h_{21}^{[2]}(2)h_2^{[1]}(1) - h_{22}^{[2]}(2)h_1^{[1]}(1)$$

Therefore, when the high speed access point 230 performs zero-forcing beamforming using a matrix, such as expressed by Equation 6, the high speed access point 230 may obtain a signal as expressed by Equation 7.

$$U = \begin{bmatrix} -h_{21}^{[1]}(1) & h_{11}^{[1]}(1) & 0 & 0 \\ 0 & 0 & -h_{22}^{[2]}(2) & h_{12}^{[2]}(2) \end{bmatrix}$$ [Equation 6]

$$\begin{bmatrix} y_2^{[2]}(1) \\ y_2^{[2]}(2) \end{bmatrix} =$$ [Equation 7]

$$\begin{bmatrix} -h_{21}^{[1]}(1)\alpha_1 + h_{11}^{[1]}(1)\alpha_2 & 0 \\ 0 & -h_{22}^{[2]}(2)\alpha_3 + h_{12}^{[2]}(2)\alpha_4 \end{bmatrix} \begin{bmatrix} u_1^{[2]} \\ u_2^{[2]} \end{bmatrix} + Z^{[2]}$$

Referring to Equation 7, the base station 210 may transmit two data streams to the high speed access point 230.

In this example, the base station 210 may transmit four data streams in total through two time slots and thus, a DoF may be 2 (=4/2), being higher than the value of 1 that is a DoF of a time division multiple access (TDMA) scheme.

According to another example embodiment in the NLOS channel environment, the base station 210 may perform transmission beamforming using a single time slot based on channel information associated with the low speed access point 220. The base station 210 may generate a transmission beamforming vector with respect to the low speed access point 220 based on channel information of the low speed access point 220, and may generate a transmission beamforming vector with respect to the high speed access point 230 based on a null vector corresponding to a null space of a channel of the low speed access point 220. In this example, a DoF may be 2.

The above described communication method may also be applicable to various general cases such as the examples described below.

One such general case may be a case of increasing a number of antennas. It is assumed in this general case example that a base station services two access points. The base station uses 2N antennas, an access point moving at a high speed uses 2N antennas, and an access point moving at low speed uses N antennas, N being a natural number. In this condition, when the beamforming method is performed, a DoF of an entire system may be 2N.

Another such general case may be a case of increasing a number of access points. It is assumed in this general case example that a base station services K access points, K being a natural number. The base station uses K antennas, a single access point moving at a high speed uses K antennas, and each of remaining K−1 users use one antenna. In this condition, when the beamforming method is performed, a DoF of an entire system may be K. Accordingly, a DoF higher than the DoF of the TDMA may be obtained in the NLOS channel environment by grouping a single access point moving at a high speed and at least one access point moving at a low speed, and by performing beamforming without using channel information associated with the single access point moving at the high speed. According to example embodiments, a high transmission rate is shown in a high signal to noise ratio (SNR) band where a distance between a base station and an access point is short.

According to example embodiments, the channel information with respect to the single access point moving at the high speed is not used and thus, overhead may be reduced. According to example embodiments, a linear beamforming scheme may be used, which is appropriate for a high speed mobile environment due to a low complexity.

Figure 3:
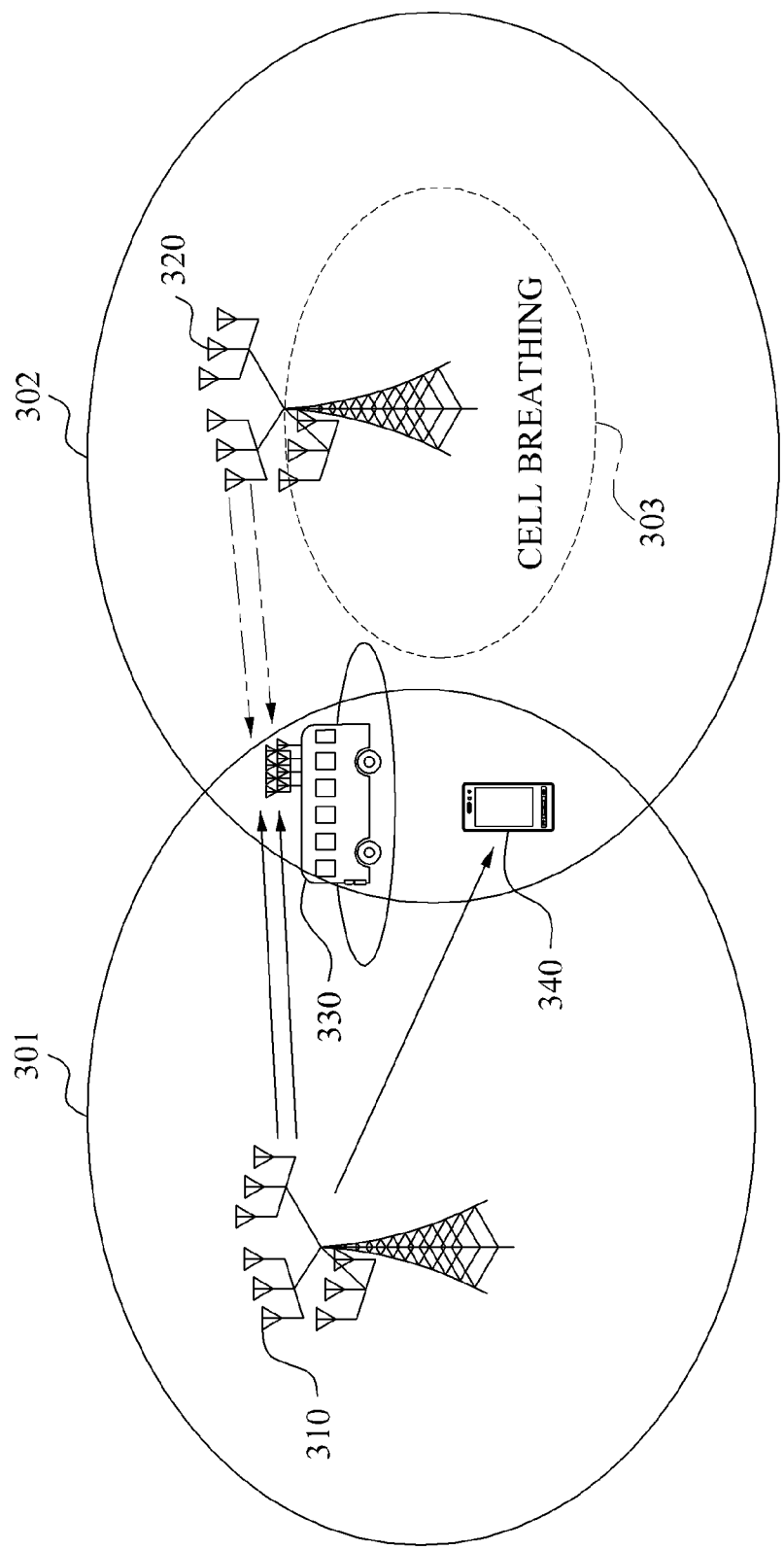
FIG. 3 is a diagram illustrating an example of utilizing an access point grouping method in an NLOS channel environment.

FIG. 3 illustrates an example of utilizing an access point grouping method in an NLOS channel environment.

Referring to FIG. 3, two cells 301 and 302 exist adjacent to one another, and two base stations 310 and 320 exist respectively corresponding to the two cells 301 and 302. Two access points, for example a high speed access point 330 and a low speed access point 340, exist at an edge of the two cells 301 and 302. According to a conventional method, a TDMA scheme may be applied to enable the base station 310 to support the two access points 330 and 340 because channel information associated with the high speed access point 330 may not be obtained. According to example embodiments, the base station 310 may simultaneously service the two access points 330 and 340 based on the above described methods with reference to FIG. 2. In this example, the adjacent base station 320 may consume a relatively less amount of resource. The adjacent base station 320 may service another access point (not illustrated) in a corresponding cell based on low transmission power, and may perform cell breathing as shown in an area 303, and thus may decrease interference to the access points 330 and 340 located at the edge of the two cells.

Figure 4:
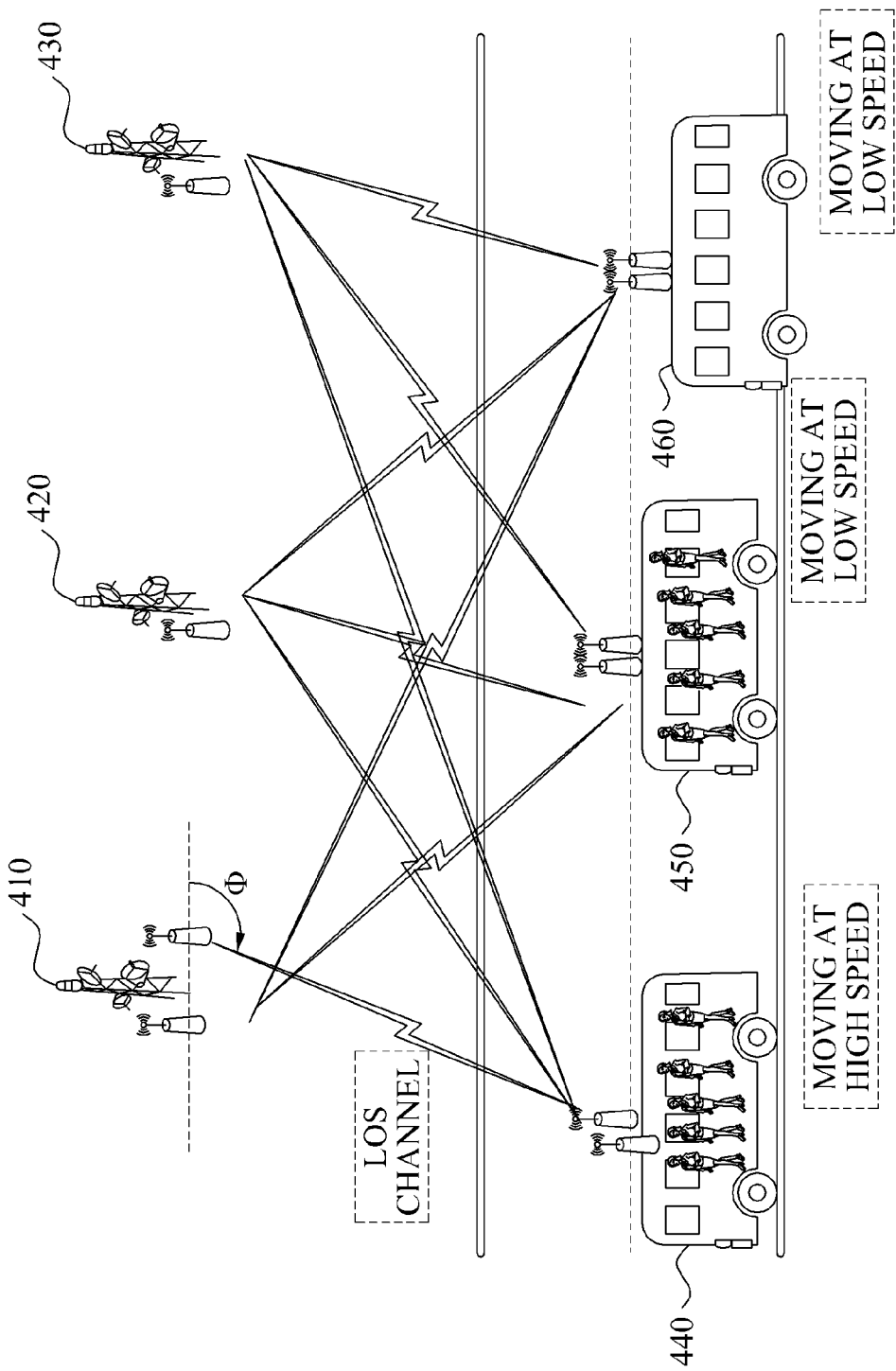
FIG. 4 is a diagram illustrating an example of grouped access points in a line of sight (LOS) channel environment.

FIG. 4 illustrates an example of grouped access points in an LOS channel environment.

Referring to FIG. 4, an access point grouping method in which a base station performs broadcasting to multiple access points included in the LOS channel environment, and a communication method based on the access point grouping method will be described.

According to the access point grouping method in the LOS channel environment, it is assumed in this example that at least three access points exist and each of the at least three access points has an LOS channel.

Similar to an NLOS channel environment, the access point grouping method and the communication method in the LOS channel environment may be applicable to a case in which a base station or an access point includes an arbitrary number of antennas or may be applicable to a case in which an arbitrary number of access points moving at a low speed exist. For ease of description, a case in which there exists a single access point moving at a high speed and two access points moving at a low speed will be described below.

In this example, three base stations 410, 420, and 430 may perform a grouping of a high speed access point 440 moving at a high speed and two low speed access points 450 and 460 moving at a low speed. A channel between each base station and each access point is an LOS channel. In this example, it is assumed that the base station 410 uses two antennas, each of remaining base stations 420 and 430 uses one antenna, and each of the access points 440, 450, and 460 uses two antennas. Another assumption in this example is that the base stations 410, 420, and 430 may not be aware of any channel information except for movement speed information associated with the access points 440, 450, and 460.

In this example, the communication method may provide an interference control scheme to a communication scenario in which data is transmitted to vehicles on a road through an RRH or an RSU installed in the vicinity of the road and each of the vehicles obtains an LOS channel. In this example, vehicles may include multiple antennas.

A beamforming method to control interference based on a result of the grouping method may be described as below. When a symbol extension through two time slots is assumed, each channel may be expressed by Equation 8.

$$H^{[11]} = \begin{bmatrix} h^{[11]}(1) & \alpha^{[11]}(1)h^{[11]}(1) & 0 & 0 \\ \gamma^{[11]}(1)h^{[11]}(1) & \gamma^{[11]}(1)\alpha^{[11]}(1)h^{[11]}(1) & 0 & 0 \\ 0 & 0 & h^{[11]}(2) & \alpha^{[11]}(2)h^{[11]}(2) \\ 0 & 0 & \gamma^{[11]}(2)h^{[11]}(2) & \gamma^{[11]}(2)\alpha^{[11]}(2)h^{[11]}(2) \end{bmatrix}$$ [Equation 8]

$$H^{[12]} = \begin{bmatrix} h^{[12]}(1) & 0 \\ \gamma^{[12]}(1)h^{[12]}(1) & 0 \\ 0 & h^{[12]}(2) \\ 0 & \gamma^{[12]}(2)h^{[12]}(2) \end{bmatrix}$$

$$\vdots$$

A notation may be basically the same as the NLOS channel environment. However, $H^{[ij]}$ may denote a channel from a base station j to an access point i. i and j may denote an index of an access point and an index of a base station, respectively. $\alpha^{[ij]} = \exp(j(2\pi d/\lambda)\cos(\Phi^{[ij]}))$, and $\gamma^{[ij]} = \exp(-j(2\pi(n-1)d/\lambda)\cos(\Phi^{[ij]}))$. $\Phi^{[ij]}$ may denote an angle between a predetermined reference straight line and a straight line between a first antenna of the base station j and a first antenna of the access point i. $\lambda$ is a wavelength of a transmission signal. A speed of the high speed access point 440 is assumed to be fast and thus, a coherence time of $H^{[11]}$, $H^{[12]}$, and $H^{[31]}$ may be 1, and a coherence time of the remaining two access points 450 and 460 may be 2.

In this example, each of the base stations 410, 420, and 430 may perform linear beamforming as shown below. A signal that each base station transmits may be expressed by Equation 9.

$$X^{[1]} = \begin{bmatrix} 1 & 0 \\ 0 & 1 \\ 1 & 0 \\ 0 & 1 \end{bmatrix} \begin{bmatrix} u_1^{[1]} \\ u_2^{[1]} \end{bmatrix}$$ [Equation 9]

$$X^{[2]} = \begin{bmatrix} 1 \\ 0 \end{bmatrix} [u_1^{[2]}]$$

$$X^{[3]} = \begin{bmatrix} 0 \\ 1 \end{bmatrix} [u_1^{[3]}]$$

In Equation 9, $X^{[1]}$ may denote a transmission signal of the base station 410, $X^{[2]}$ may denote a transmission signal of the base station 420, and $X^{[3]}$ may denote a transmission signal of the base station 430.

A signal that the high speed access point 440 receives may be expressed by Equation 10.

$$\begin{bmatrix} y_1^{[1]}(1) \\ y_2^{[1]}(1) \\ y_1^{[1]}(2) \\ y_2^{[1]}(2) \end{bmatrix} =$$ [Equation 10]

$$\begin{bmatrix} h^{[11]}(1) & \alpha^{[11]}(1)h^{[11]}(1) \\ \gamma^{[11]}(1)h^{[11]}(1) & \gamma^{[11]}(1)\alpha^{[11]}(1)h^{[11]}(1) \\ h^{[11]}(2) & \alpha^{[11]}(2)h^{[11]}(2) \\ \gamma^{[11]}(2)h^{[11]}(2) & \gamma^{[11]}(2)\alpha^{[11]}(2)h^{[11]}(2) \end{bmatrix} \begin{bmatrix} u_1^{[1]} \\ u_2^{[1]} \end{bmatrix} +$$

$$\begin{bmatrix} h^{[12]}(1) \\ \gamma^{[12]}(1)h^{[12]}(1) \\ 0 \\ 0 \end{bmatrix} [u_1^{[2]}] + \begin{bmatrix} 0 \\ 0 \\ h^{[13]}(1) \\ \gamma^{[13]}(1)h^{[13]}(1) \end{bmatrix} [u_1^{[3]}] + Z^{[1]}$$

Therefore, when the high speed access point 440 may perform zero-forcing using a matrix, such as expressed in Equation 11, the high speed access point 440 may obtain a signal as expressed by Equation 12. Two data streams may be transmitted to the high speed access point 440.

$$U_1 = \begin{bmatrix} \gamma^{[12]}(1) & -1 & 0 & 0 \\ 0 & 0 & \gamma^{[13]}(1) & -1 \end{bmatrix}$$ [Equation 11]

$$\begin{bmatrix} y^{[1]}(1) \\ y^{[1]}(2) \end{bmatrix} = \begin{bmatrix} (\gamma^{[12]}(1) - \gamma^{[11]}(1))h^{[11]}(1) & \alpha^{[11]}(1)(\gamma^{[12]}(1) - \gamma^{[11]}(1))h^{[11]}(1) \\ (\gamma^{[13]}(1) - \gamma^{[11]}(2))h^{[11]}(2) & \alpha^{[11]}(2)(\gamma^{[13]}(1) - \gamma^{[11]}(2))h^{[11]}(2) \end{bmatrix} \begin{bmatrix} u_1^{[1]} \\ u_2^{[1]} \end{bmatrix} + Z^{[2]}$$ [Equation 12]

A signal that the low speed access point 450 receives may be expressed by Equation $$\begin{bmatrix} y_1^{[2]}(1) \\ y_2^{[2]}(1) \\ y_1^{[2]}(2) \\ y_2^{[2]}(2) \end{bmatrix} = \begin{bmatrix} h^{[21]}(1) & \alpha^{[21]}(1)h^{[21]}(1) \\ \gamma^{[21]}(1)h^{[21]}(1) & \gamma^{[21]}(1)\alpha^{[21]}(1)h^{[21]}(1) \\ h^{[21]}(1) & \alpha^{[21]}(1)h^{[21]}(1) \\ \gamma^{[21]}(1)h^{[21]}(1) & \gamma^{[21]}(1)\alpha^{[21]}(1)h^{[21]}(1) \end{bmatrix} \begin{bmatrix} u_1^{[1]} \\ u_2^{[1]} \end{bmatrix} +$$ [Equation 13]

-continued $$\begin{bmatrix} h^{[22]}(1) \\ \gamma^{[22]}(1)h^{[22]}(1) \\ 0 \\ 0 \end{bmatrix}[u_1^{[2]}] + \begin{bmatrix} 0 \\ 0 \\ h^{[23]}(1) \\ \gamma^{[23]}(1)h^{[23]}(1) \end{bmatrix}[u_1^{[3]}] + Z^{[2]}$$

Therefore, when the low speed access point 450 performs zero-forcing using a matrix, such as expressed in Equation 14, the low speed access point 450 may obtain a signal as expressed by Equation 15. A single data stream may be transmitted to the low speed access point 450.

$$U_2 = [\gamma^{[21]}(1) \; -1 \; 0 \; 0] \quad \text{[Equation 14]}$$

$$[y^{[2]}] = [(\gamma^{[21]}(1) - \gamma^{[22]}(1))h^{[22]}(1)][u_1^{[2]}] + z^{[2]} \quad \text{[Equation 15]}$$

In the same manner, the low speed access point 460 may also receive a single data stream.

According to an example embodiment, four data streams may be transmitted using two time slots, and thus a DoF may be 2. Therefore, a transmission rate may be improved compared with a TDMA scheme having a DoF of 1.

The above described communication method may also be applicable to various general cases.

As one example of such a general case, it is assumed that there exists K base stations and K access points, and only LOS channels exist between the K base stations and K access points. In this example, a single high speed access point moving at a high speed uses $1+(K-1)/2$ antennas, and each of K−1 low speed access points moving at a low speed uses $1+(K-2)/2$ antennas. Under such a condition, when beamforming is performed based on the described beamforming method, a total DoF may be $1+(K-1)/2$.

Accordingly, a DoF higher than the conventional DoF of the TDMA may be obtained in the LOS channel environment by grouping a single access point moving at a high speed and at least two access points moving at a low speed, and by performing beamforming based on a time and spatial correlation of each channel. Each base station may perform beamforming without using channel information, and thus overhead may be reduced. Also, the described methods may use a linear beamforming scheme and thus may be appropriate for a high speed mobile environment due to a low complexity.

Figure 5:
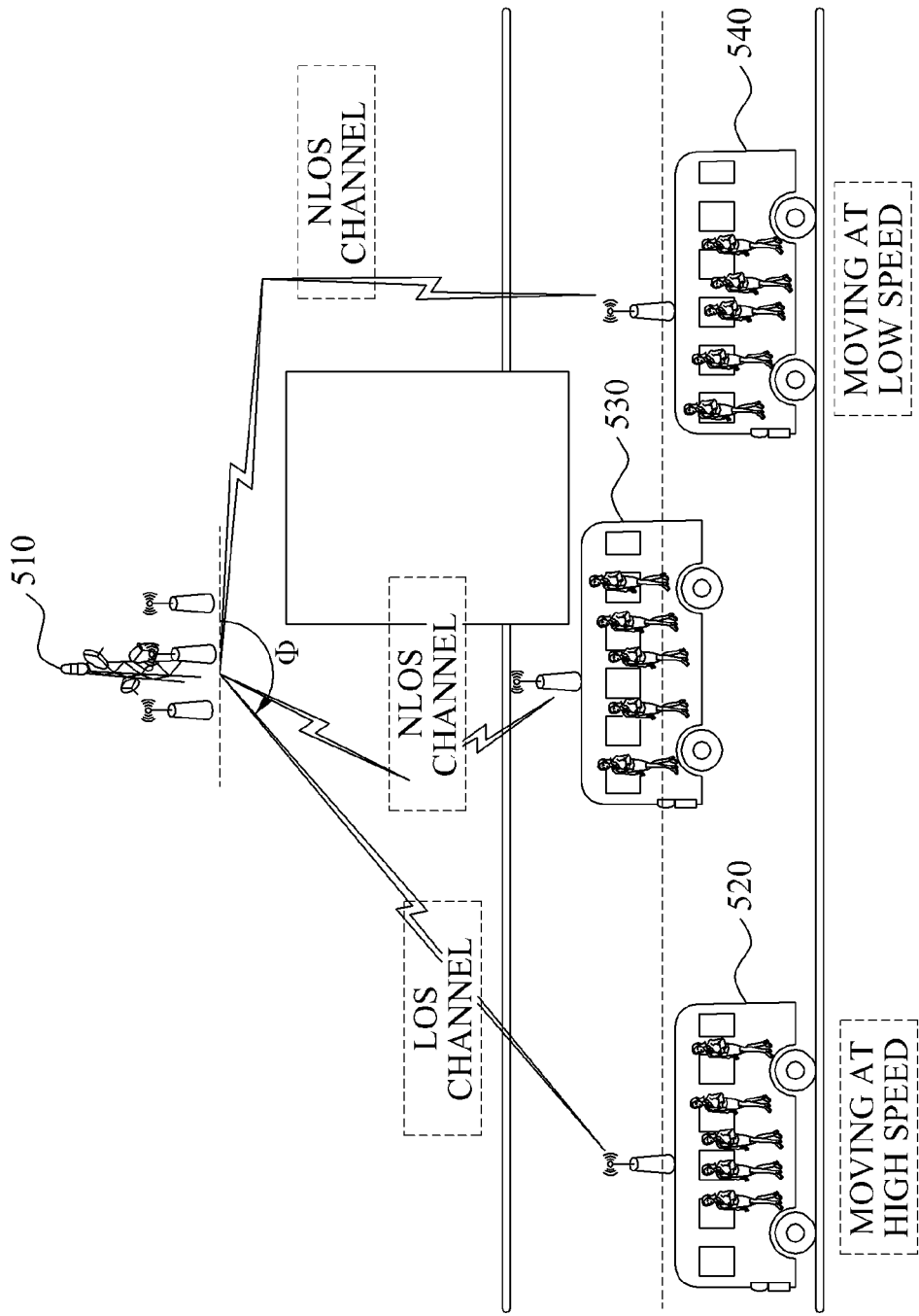
FIG. 5 is a diagram illustrating an example of grouped access points in an LOS channel and NLOS channel environment in which both an LOS channel and an NLOS channel exist.

FIG. 5 illustrates an example of grouped access points in an LOS channel and NLOS channel environment in which both an LOS channel and an NLOS channel exist.

Referring to FIG. 5, an access point grouping method in which a base station performs broadcasting to multiple access points included in an environment where both the NLOS channel and the LOS channel exist, and a communication method based on the access point grouping method, will be described.

According to the access point grouping method in the LOS channel and NLOS channel environment, it is assumed in this example that at least three access points exist.

Similar to an NLOS channel environment and an LOS channel environment, the access point grouping method and the communication method in the LOS channel and NLOS channel environment may be applicable to a case in which a base station or an access point includes an arbitrary number of antennas, or may be applicable to a case in which there exists an arbitrary number of access points moving at a low speed. For ease of description, a case in which there exists a single access point moving at a high speed and two access points moving at a low speed will be described below.

First, the base station 510 may perform a grouping of a high speed access point 520 moving at a high speed and two low speed access points 530 and 540 moving at a low speed. In this example, the base station 510 may use three antennas and each of the high speed access point 520 and two low speed access points 530 and 540 may use one antenna. When the grouping is performed, beamforming may be performed only based on angle information of each time, the angle information being associated with the high speed access point 520. The base station 510 may obtain the angle information based on location information associated with the high speed access point 520. Accordingly, the base station 510 may request the location information associated with the high speed access point 520, from the high speed access point 520. The angle information may be associated with an angle between a predetermined reference straight line and a straight line from the base station 510 to the high speed access point 520.

The communication method may be applicable to a scenario in which a base station generally has difficulty in obtaining an LOS channel, but obtains the LOS channel when a vehicle passes the base station in a proximity to the base station and at a high speed. In this example, the base station is assumed to be an RRH or a RSU and an access point is assumed to be a vehicle. The communication method may also be applicable to a case in which access points moving at a relatively low speed are fast enough for the base station to have difficulty in obtaining corresponding channel information.

A beamforming method to control interference based on a result of the grouping method may be described as below. When a symbol extension through three time slots is assumed, a signal that the high speed access point 520 receives may be expressed by Equation 16. X may be a signal that the base station 510 transmits.

[Equation 16]

$$\begin{bmatrix} y^{[1]}(1) \\ y^{[1]}(2) \\ y^{[1]}(3) \end{bmatrix} =$$

$$\begin{bmatrix} h_1^{[1]}(1) & \alpha_1(1)h_1^{[1]}(1) & \alpha_2(1)h_1^{[1]}(1) & 0 & 0 & 0 & 0 & 0 & 0 \\ 0 & 0 & 0 & h_1^{[1]}(2) & \alpha_1(2)h_1^{[1]}(2) & \alpha_2(2)h_1^{[1]}(2) & 0 & 0 & 0 \\ 0 & 0 & 0 & 0 & 0 & 0 & h_1^{[1]}(3) & \alpha_1(3)h_1^{[2]}(3) & \alpha_2(3)h_1^{[1]}(3) \end{bmatrix} X + Z^{[1]}$$

In the same manner, a signal that the low speed access point 530 receives may be expressed by Equation 17.

$$\begin{bmatrix} y^{[2]}(1) \\ y^{[2]}(2) \\ y^{[2]}(3) \end{bmatrix} = \begin{bmatrix} h_1^{[2]}(1) & h_2^{[2]}(1) & h_3^{[2]}(1) & 0 & 0 & 0 & 0 & 0 & 0 \\ 0 & 0 & 0 & h_1^{[2]}(1) & h_2^{[2]}(1) & h_3^{[2]}(1) & 0 & 0 & 0 \\ 0 & 0 & 0 & 0 & 0 & 0 & h_1^{[2]}(1) & h_2^{[2]}(1) & h_3^{[2]}(1) \end{bmatrix} X + Z^{[2]}$$

[Equation 17]

A signal that the low speed access point 540 receives may be expressed by Equation 18.

$$\begin{bmatrix} y^{[3]}(1) \\ y^{[3]}(2) \\ y^{[3]}(3) \end{bmatrix} = \begin{bmatrix} h_1^{[3]}(1) & h_2^{[3]}(1) & h_3^{[3]}(1) & 0 & 0 & 0 & 0 & 0 & 0 \\ 0 & 0 & 0 & h_1^{[3]}(1) & h_2^{[3]}(1) & h_3^{[3]}(1) & 0 & 0 & 0 \\ 0 & 0 & 0 & 0 & 0 & 0 & h_1^{[3]}(1) & h_2^{[3]}(1) & h_3^{[3]}(1) \end{bmatrix} X + Z^{[3]}$$

[Equation 18]

Notations may be the same as the notations described with reference to FIGS. 2 and 4. A signal that the base station 510 transmits may be expressed by Equation 19.

$$X = \begin{bmatrix} 1 & 0 & 0 \\ 0 & 1 & 0 \\ 0 & 0 & 1 \\ 1 & 0 & 0 \\ 0 & 1 & 0 \\ 0 & 0 & 1 \\ 1 & 0 & 0 \\ 0 & 1 & 0 \\ 0 & 0 & 1 \end{bmatrix} \begin{bmatrix} u_1^{[1]} \\ u_2^{[1]} \\ u_3^{[1]} \end{bmatrix} + \begin{bmatrix} 1 \\ -\alpha_1(1) \\ 0 \\ 0 \\ 0 \\ 0 \\ 0 \\ 0 \\ 0 \end{bmatrix} [u_1^{[2]}] + \begin{bmatrix} 0 \\ 0 \\ 0 \\ 1 \\ -\alpha_1(2) \\ 0 \\ 0 \\ 0 \\ 0 \end{bmatrix} [u_1^{[3]}]$$

[Equation 19]

In Equation 19, $u_1^{[1]}$, $u_2^{[1]}$, and $u_3^{[1]}$ may denote a first symbol, a second symbol, and a third symbol to be transmitted to the high speed access point 520, respectively. $u_1^{[2]}$ may denote a first symbol to be transmitted to the low speed access point 530 and $u_1^{[3]}$ may denote a first symbol to be transmitted to the low speed access point 540. $\alpha_m^{[i/j]} = \exp(j(2\pi(m-1)d/\lambda)\cos(\Phi^{[i/j]}))$, and $\gamma_n^{[i/j]} = \exp(-j(2\pi(n-1)d/\lambda)\cos(\Phi^{[i/j]}))$. $\Phi^{[i/j]}$ may denote an angle between a predetermined reference straight line and a straight line between a first antenna of a base station j and a first antenna of an access point i. m may denote an index of an antenna of the base station 510 and n may denote an index of an antenna of the high speed access point 520. d may denote an interval between antennas of the base station 510 or the high speed access point 520.

Accordingly, a transmission beamforming vector may be generated based only on information associated with α. α may be determined based on angle information associated with the high speed access point 520. The angle information may be obtained based on location information associated with the high speed access point 520.

When the base station 510 performs transmission beamforming as described above, the high speed access point 520 may receive a signal, the signal being expressed by Equation 20.

$$\begin{bmatrix} y^{[1]}(1) \\ y^{[1]}(2) \\ y^{[1]}(3) \end{bmatrix} =$$

[Equation 20]

-continued $$\begin{bmatrix} h_1^{[1]}(1) & \alpha_1(1)h_1^{[2]}(1) & \alpha_2(1)h_1^{[2]}(1) \\ h_1^{[1]}(2) & \alpha_1(2)h_1^{[2]}(2) & \alpha_2(2)h_1^{[2]}(2) \\ h_1^{[2]}(3) & \alpha_1(3)h_1^{[2]}(3) & \alpha_2(3)h_1^{[2]}(3) \end{bmatrix} \begin{bmatrix} u_1^{[1]} \\ u_2^{[1]} \\ u_3^{[1]} \end{bmatrix} + Z^{[1]}$$

The high speed access point 520 may receive three data streams from the base station 510.

A signal that the low speed access point 530 receives may be expressed by Equation 21.

$$\begin{bmatrix} y^{[2]}(1) \\ y^{[2]}(2) \\ y^{[2]}(3) \end{bmatrix} = \begin{bmatrix} h_1^{[2]}(1) & h_2^{[2]}(1) & h_3^{[2]}(1) \\ h_1^{[2]}(1) & h_2^{[2]}(1) & h_3^{[2]}(1) \\ h_1^{[2]}(1) & h_2^{[2]}(1) & h_3^{[2]}(1) \end{bmatrix}$$

[Equation 21]

$$\begin{bmatrix} u_1^{[1]} \\ u_2^{[1]} \\ u_3^{[1]} \end{bmatrix} + \begin{bmatrix} h_1^{[2]}(1) - \alpha_1(1)h_2^{[2]}(1) \\ 0 \\ 0 \end{bmatrix} [u_1^{[2]}] +$$

$$\begin{bmatrix} 0 \\ h_1^{[2]}(2) - \alpha_1(2)h_2^{[2]}(2) \\ 0 \end{bmatrix} [u_1^{[3]}] + Z^{[2]}$$

The low speed access point 530 may obtain a single data stream by performing zero-forcing using a matrix, such as expressed in Equation 22.

$$U_2 = [1 \ 0 \ -1]$$

[Equation 22]

In the same manner, a signal that the low speed access point 540 receives may be expressed by Equation 23.

$$\begin{bmatrix} y^{[3]}(1) \\ y^{[3]}(2) \\ y^{[3]}(3) \end{bmatrix} = \begin{bmatrix} h_1^{[3]}(1) & h_2^{[3]}(1) & h_3^{[3]}(1) \\ h_1^{[3]}(1) & h_2^{[3]}(1) & h_3^{[3]}(1) \\ h_1^{[3]}(1) & h_2^{[3]}(1) & h_3^{[3]}(1) \end{bmatrix}$$

[Equation 23]

$$\begin{bmatrix} u_1^{[1]} \\ u_2^{[1]} \\ u_3^{[1]} \end{bmatrix} + \begin{bmatrix} h_1^{[3]}(1) - \alpha_1(1)h_2^{[3]}(1) \\ 0 \\ 0 \end{bmatrix}$$

$$[u_1^{[2]}] + \begin{bmatrix} 0 \\ h_1^{[3]}(2) - \alpha_1(2)h_2^{[3]}(2) \\ 0 \end{bmatrix} [u_1^{[3]}] + Z^{[2]}$$

The low speed access point 540 may obtain a single data stream by performing zero-forcing using a matrix, such as Equation 24.

$$U_3 = [0 \ 1 \ -1] \quad \text{[Equation 24]}$$

Accordingly, five data streams may be transmitted using three time slots in total, and thus a DoF of an entire system may be 5/3, which is higher than a value of 1 that is a DoF of a conventional TDMA scheme.

The above described communication method may also be applicable to various general cases.

One example of such a general case involves increasing a number of antennas. In this example it is assumed that three access points are grouped. A base station may use M antennas (M≥M1+M2+1), an access point moving at a high speed may use one antenna, and two access points moving at low speed may use M1 antennas and M2 antennas, respectively. Under such a condition, when the beamforming method is performed, a DoF of an entire system may be 1+(M1+M2)/3.

Another example of such a general case involves increasing a number of access points. In this example it is assumed that K access points are grouped. Each of the access points may use one antenna, and a base station may use K antennas. A coherence time of a single access point moving at a high speed through an LOS channel is 1, and a coherence time of the remaining K−1 access points moving at a low speed through NLOS channels may be K. Under such a condition, when the beamforming method is performed, a DoF of an entire system may be 1+(K−1)/K.

Accordingly, a DoF higher than the conventional DoF of the TDMA may be obtained by grouping a single access point moving at a high speed and having an LOS channel and at least two access points moving at a low speed and having NLOS channels, and by performing beamforming based on a time and spatial correlation of each channel. Each base station may perform beamforming using angle information associated with the access point moving at the high speed, even though the base station is not aware of channel information. Therefore, overhead may be reduced.

Figure 6:
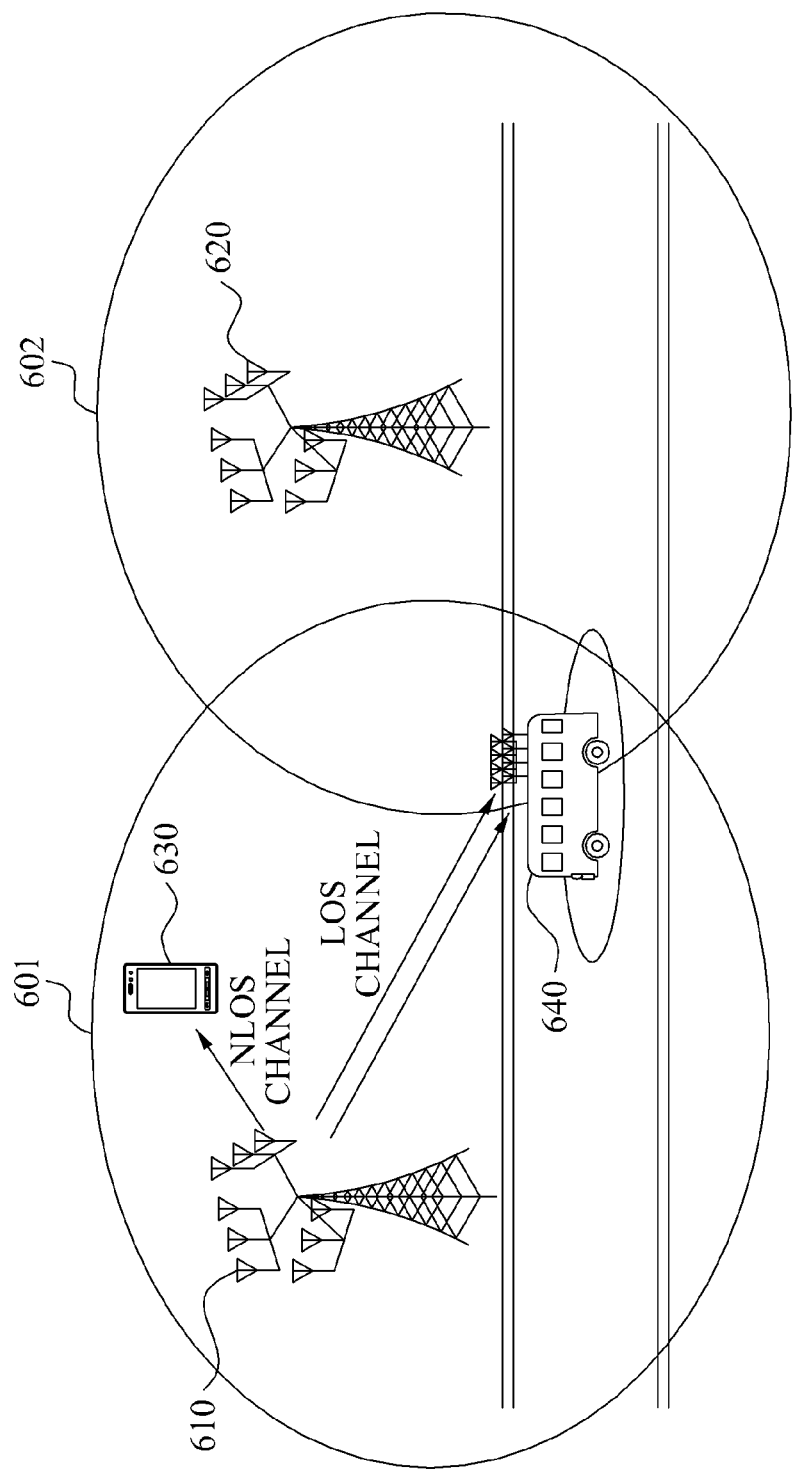
FIG. 6 is a diagram illustrating an example of utilizing an access point grouping method in an LOS channel and NLOS channel environment in which both an LOS channel and an NLOS channel exist.

FIG. 6 illustrates an example of utilizing an access point grouping method in an LOS channel and NLOS channel environment where both an LOS channel and an NLOS channel exist.

Referring to FIG. 6, two cells 601 and 602 exist adjacent to one another, and two base stations 610 and 620 exist respectively corresponding to the two cells 601 and 602. The base stations 610 and 620 may be arranged along a road. An access point 640 having an LOS channel and moving along the road at a high speed may exist at the edge of the two cells 601 and 602. An access point 630 having an NLOS channel with respect to the base station 610 may be a terminal. According to a conventional method, the access point 630 receives a service from a macro base station (not illustrated) and the access point 640 receives a service from the base station 610. Accordingly, a signal that the base station 610 transmits to the access point 640 may result in interference with the access point 630. According to example embodiments, the base station 610 may simultaneously service the two access points 630 and 640 by grouping the two access points 630 and 640. Therefore, interference suffered by the access point 630 may be reduced.

The method according to the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a non-transitory computer-readable storage medium may be distributed among computer systems connected through a network and non-transitory computer-readable codes or program instructions may be stored and executed in a decentralized manner.

Figure 7:
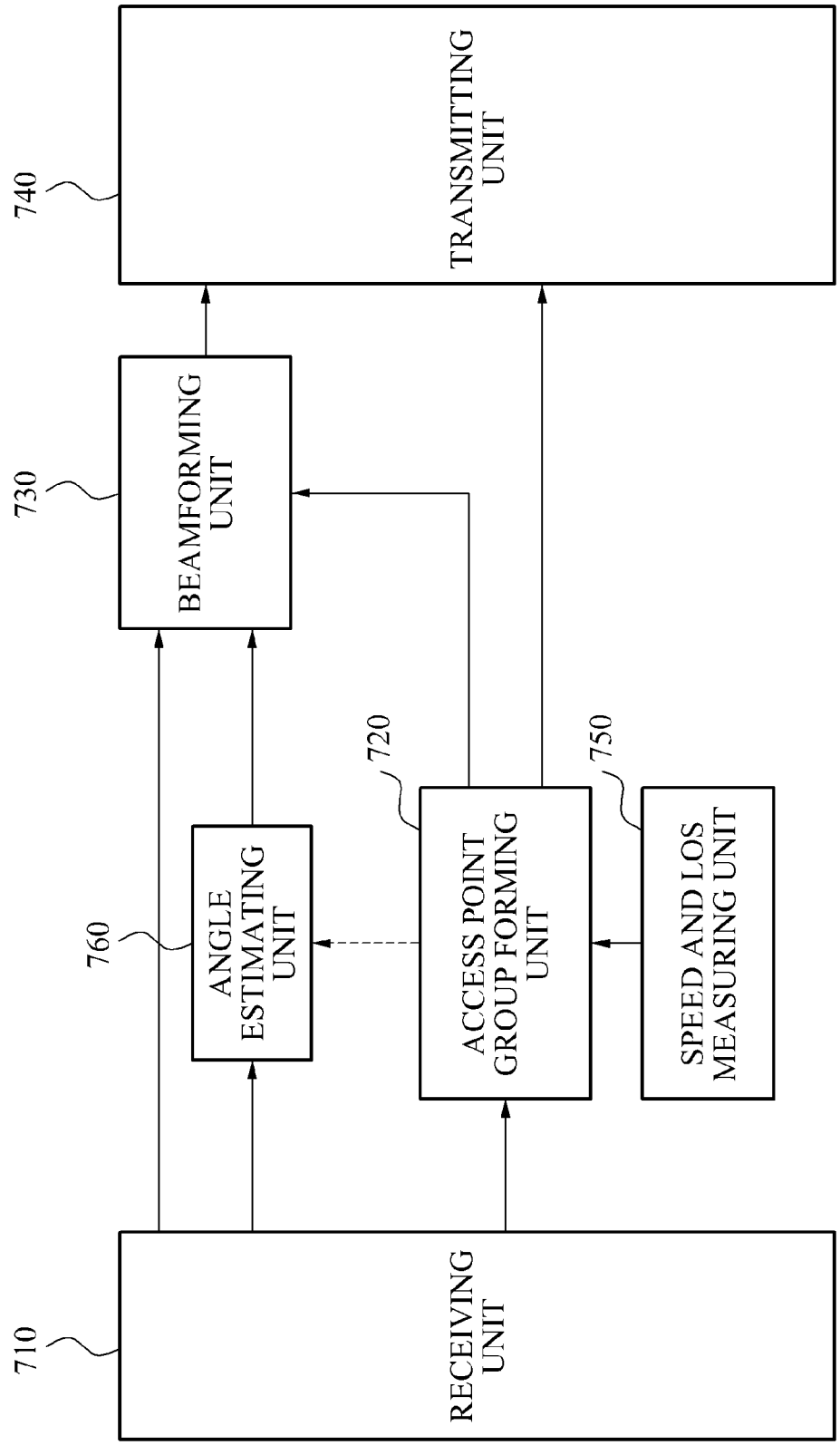
FIG. 7 is a block diagram illustrating an example of a base station.

FIG. 7 illustrates an example of a base station. The base station may be an RRH to support a femtocell for vehicles.

Referring to FIG. 7, the base station may include a receiving unit 710, an access point group forming unit 720, a beamforming unit 730, and a transmitting unit 740. The base station may further include a speed and LOS measuring unit 750 and/or an angle estimating unit 760.

The receiving unit 710 may receive a variety of information from an access point.

The access point group forming unit 720 may perform a grouping of at least two access points to include an access point moving at a high speed and at least one access point moving at a low speed, based on movement speed information of the at least two access points and information associated with whether LOS channels exist between the base station and the at least two access points.

The beamforming unit 730 may generate a transmission beamforming vector based on a result of the grouping of the at least two access points based on the movement speed information and the information associated with whether the LOS channels exist.

The transmitting unit 740 may transmit, to an access point, a signal that the base station generates. The transmitting unit 740 may request, from the at least two access points, the movement speed information of the corresponding access points or the information associated with whether the LOS channels exist with respect to the corresponding access points.

A speed and LOS measuring unit 750 may estimate the movement speed information or the information associated with whether the LOS channels exist. The movement speed may be measured using an uplink channel with a corresponding access point, and the information associated with whether the LOS channels exist may be measured by a speed measuring device. In a configuration in which the base station includes the speed and LOS measuring unit 750, the base station may not need to request, from the access points, the movement speed information or the information associated with whether the LOS channels exist.

The angle estimating unit 760 may estimate an angle formed between the base station and an access point based on information received from the access point.

Figure 8:
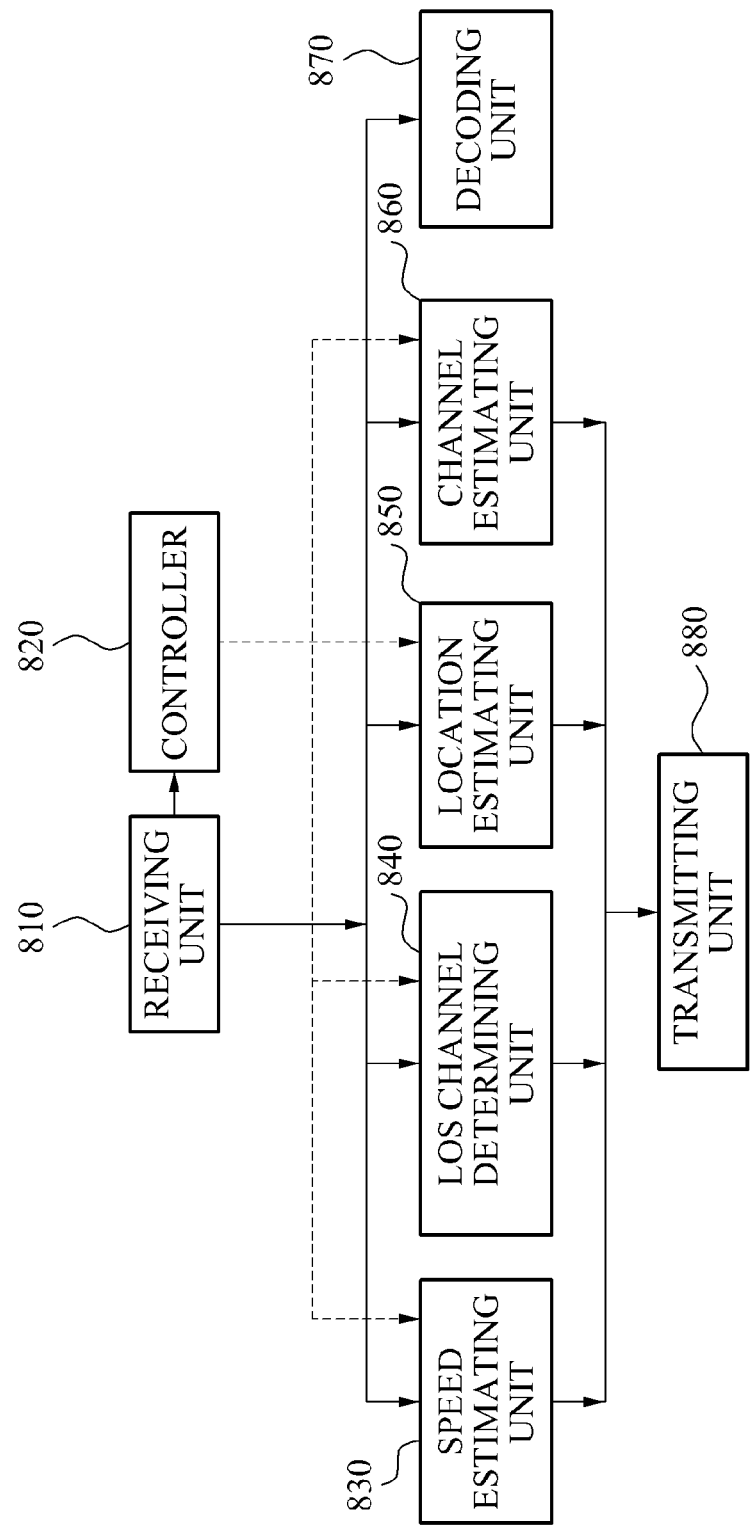
FIG. 8 is a block diagram illustrating an example of an access point.

FIG. 8 illustrates an example of an access point. The access point may be a terminal, a base station included in a vehicle corresponding to a femtocell for vehicles, and so on.

Referring to FIG. 8, the access point may include a receiving unit 810, a controller 820, a speed estimating unit 830, an LOS channel determining unit 840, a location estimating unit 850, a channel estimating unit 860, a decoding unit 870, and a transmitting unit 880.

The receiving unit 810 may receive data from a base station. The receiving unit 810 may receive a request for information to be used when the base station performs a grouping of access points or generates a transmission beamforming vector. The information used in grouping the access points may include movement speed information associated with corresponding access points and information associated with whether LOS channels exist.

The controller 820 may analyze requests received from the base station. The controller 820 may be connected to the speed estimating unit 830, the LOS channel determining unit 840, the location estimating unit 850, and the channel estimating unit 860, and may control various modules corresponding to the requests.

The speed estimating unit 830 may estimate a movement speed of the access point, according to the controller 820.

The LOS channel determining unit 840 may determine whether an LOS channel exists between the base station and the access point, according to the controller 820.

The location estimating unit 850 may estimate location information associated with the access point. The location information associated with the access point may be used when the base station estimates angle information associated with the access point. The location estimating unit 850 may operate according to the controller 820.

The channel estimating unit 860 may estimate a channel between the base station and the access point. The channel estimating unit 860 may operate according to controller 820.

The decoding unit 870 may decode, based on a zero-forcing scheme, data received from the base station.

The transmitting unit 880 may feed back, to the base station, a variety of information obtained from the speed estimating unit 830, the LOS channel determining unit 840, the location estimating unit 850, or the channel estimating unit 860. The transmitting unit 880 may feed back, to the base station, the movement speed information of the access point, information associated with whether the LOS channel exists, the location information associated with the access point, or corresponding channel information.

The base station and the access point described in FIGS. 7 and 8 are merely example embodiments of such elements. Example embodiments described with reference to FIGS. 1 through 6 may be applicable to the base station and the access point of FIGS. 7 and 8, and thus detailed descriptions thereof will be omitted.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a base station, the method comprising:
grouping at least two access points to include an access point moving at a first range speed and at least one access point moving at a second range speed, the grouping being performed based on movement speed information associated with the at least two access points and information associated with whether line of sight (LOS) channels exist between the at least two access points and a base station, and the first access range speed being faster than the second access range speed; and
generating a transmission beamforming vector based on a result of the grouping based on the movement speed information and the information associated with whether the LOS channels exist.

2. The method of claim 1, further comprising:
requesting, from the at least two access points, the movement speed information and/or the information associated with whether the LOS channels exist with respect to the corresponding access points.

3. The method of claim 1, further comprising:
measuring, using an uplink channel and/or a speed measuring device, the movement speed information and/or the information associated with whether the LOS channels exist.

4. The method of claim 1, wherein the grouping comprises:
grouping the access point moving at the first range speed and having a non line of sight (NLOS) channel and the at least one access point moving at the second range speed and having an NLOS channel.

5. The method of claim 4, further comprising:
estimating channel information associated with the grouped at least one access point moving at the second range speed.

6. The method of claim 4, wherein the generating comprises:
generating, based on channel information associated with the grouped at least one access point moving at the second range speed, a transmission beamforming vector with respect to the grouped at least one access point moving at the second range speed; and
generating, based on a null vector of a channel with respect to the grouped at least one access point moving at the second range speed, a transmission beamforming vector with respect to the access point moving at the first range speed.

7. The method of claim 1, wherein the grouping comprises:
grouping the access point moving at the first range speed and having an LOS channel and at least two access points moving at the second range speed and having LOS channels.

8. The method of claim 7, wherein the generating comprises:
generating the transmission beamforming vector based on a time and spatial correlation of channels with respect to the grouped access points.

9. The method of claim 1, wherein the grouping comprises:
grouping the access point moving at the first range speed and having an LOS channel and at least two access points moving at the second range speed and having non line of sight (NLOS) channels.

10. The method of claim 9, further comprising:
requesting, from the grouped access point moving at the first range speed, location information associated with the grouped access point moving at the first range speed to estimate angle information associated with the grouped access point moving at the first range speed; and
estimating the angle information based on the location information.

11. The method of claim 10, wherein the generating comprises:

generating the transmission beamforming vector based on the angle information associated with the grouped access point moving at the first range speed.

12. A base station, comprising:
- an access point group forming unit to perform grouping of at least two access points to include an access point moving at a first range speed and at least one access point moving at a second range speed, the grouping being performed based on movement speed information associated with the at least two access points and information associated with whether line of sight (LOS) channels exist between the at least two access points and a base station; and
- a beamforming unit to generate a transmission beamforming vector based on a result of the grouping based on the movement speed information and the information associated with whether the LOS channels exist.

13. The base station of claim 12, further comprising:
- a transmitting unit to request, from the at least two access points, the movement speed information of the corresponding access points and/or the information associated with whether the LOS channels exist with respect to the corresponding access points.

14. The base station of claim 12, further comprising:
- a speed and LOS measuring unit to estimate, using an uplink channel and/or a speed measuring device, the movement speed information and/or the information associated with whether the LOS channels exist.

15. The base station of claim 12, wherein the access point group forming unit performs grouping of the access point moving at the first range speed and having a non line of sight (NLOS) channel and the at least one access point moving at the second range speed and having an NLOS channel.

16. The base station of claim 15, wherein the beamforming unit performs:
- generating, based on channel information associated with the grouped at least one access point moving at the second range speed, a transmission beamforming vector with respect to the grouped at least one access point moving at the second range speed; and
- generating, based on a null vector of a channel with respect to the grouped at least one access point moving at the second range speed, a transmission beamforming vector with respect to the access point moving at the first range speed.

17. The base station of claim 12, wherein the access point group forming unit performs grouping of the access point moving at the first range speed and having an LOS channel and at least two access points moving at the second range speed and having LOS channels.

18. The base station of claim 17, wherein the beamforming unit generates the transmission beamforming vector based on a time and spatial correlation of channels with respect to the grouped access points.

19. The base station of claim 12, wherein the access point group forming unit performs grouping of the access point moving at the first range speed and having an LOS channel and at least two access points moving at the second range speed and having non line of sight (NLOS) channels.

20. The base station of claim 19, wherein the beamforming unit generates the transmission beamforming vector based on angle information associated with the grouped access point moving at the first range speed.

21. An access point, comprising:
- a receiving unit to receive, from a base station, data and requests for predetermined information to be used for grouping the access point with other access points or generating a transmission beamforming vector;
- a controller to control a corresponding module by analyzing the requests received from the base station;
- a speed estimating unit to estimate a movement speed of the access point based on the control of the controller;
- a line of sight (LOS) channel determining unit to determine, based on the control of the controller, whether an LOS channel exists between the base station and the access point; and
- a transmitting unit to feed back, to the base station, movement speed information associated with the access point and the information associated with whether the LOS exists.

22. The access point of claim 21, further comprising:
- a location estimating unit to estimate, based on the control of the controller, location information associated with the access point to enable the base station to use the estimated location information to estimate angle information associated with the access point.

23. The access point of claim 21, further comprising:
- a channel estimating unit to estimate a channel between the base station and the access point, based on the control of the controller.

24. The access point of claim 21, further comprising:
- a decoding unit to decode the data received from the base station based on a zero-forcing scheme.

25. A communication method of a base station, the method comprising generating a transmission beamforming vector to communicate with a first access point moving faster than a second access point based on movement speed of the first and second access points and information regarding whether line of sight (LOS) channels exist between the base station and the first and second access points.

* * * * *